United States Patent [19]

Strybel

[11] 3,834,743
[45] Sept. 10, 1974

[54] TUBE COUPLING
[75] Inventor: Richard V. Strybel, Elk Grove Village, Ill.
[73] Assignee: Imperial-Eastman Corporation, Chicago, Ill.
[22] Filed: Nov. 20, 1972
[21] Appl. No.: 308,144

[52] U.S. Cl.............. 285/249, 285/331, 285/341, 285/382.7
[51] Int. Cl............................................ F16l 33/00
[58] Field of Search......... 285/249, 341, 331, 382.7

[56] References Cited
UNITED STATES PATENTS
2,013,732   9/1935   Marvin................... 285/382.7 X
3,219,367  11/1965   Frank..................... 285/341 X
3,659,881   5/1972   Tinsley et al............. 285/331 X FOREIGN PATENTS OR APPLICATIONS
454,793    4/1936   Great Britain............ 285/341
831,127    3/1960   Great Britain............ 285/341
1,130,835 10/1968   Great Britain............ 285/341
1,201,120  7/1959   France.................... 285/249

Primary Examiner—Dave W. Arola
Attorney, Agent, or Firm—Hofgren, Wegner, Allen, Stellman & McCord

[57] ABSTRACT

A tube coupling having an insert receivable within the end of the tube to be coupled and a clamping sleeve constricted about the tube end. The coupling includes cooperating structure on the nut and sleeve coordinated with the clamping force to permit withdrawal of the tube from the insert as an incident of threaded withdrawal of the nut from the body.

8 Claims, 5 Drawing Figures

PATENTED SEP 10 1974      3,834,743
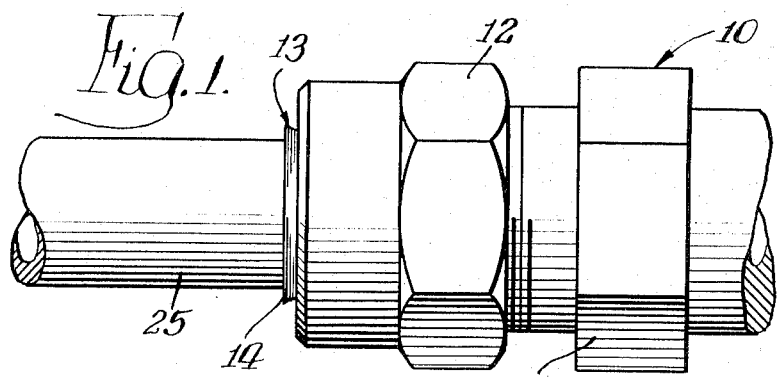
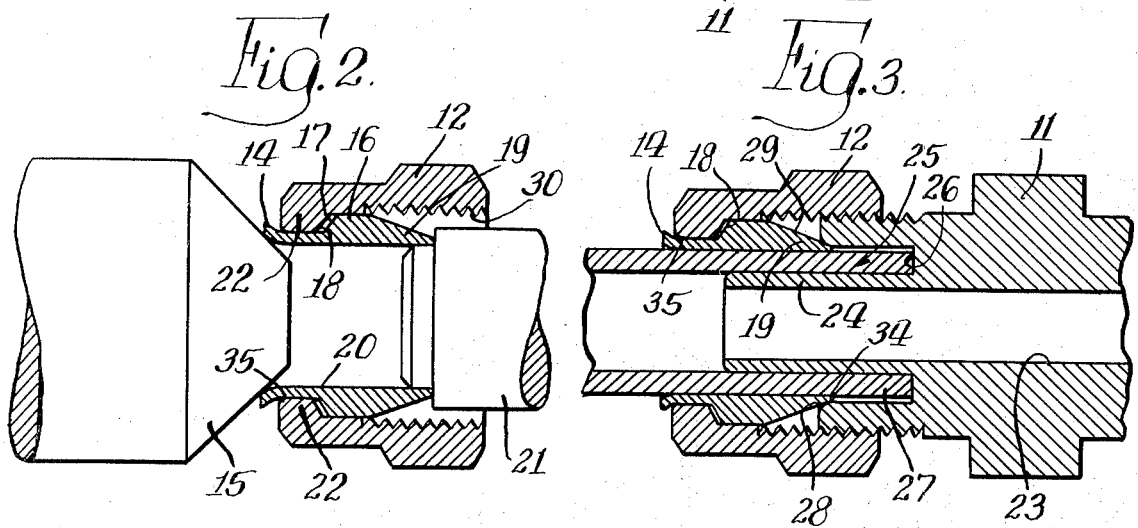
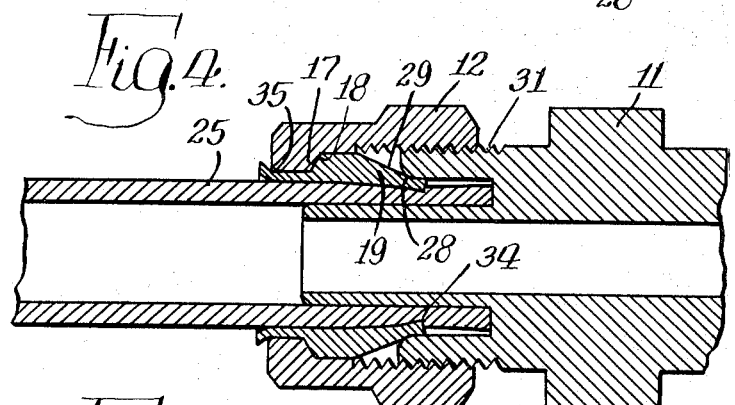
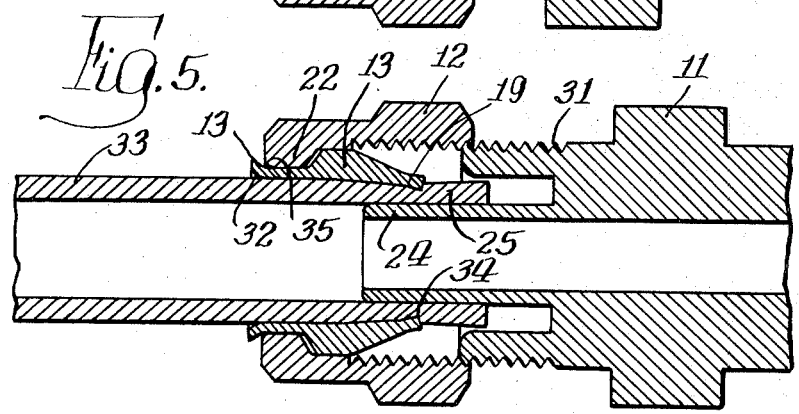

TUBE COUPLING

BACKGROUND OF THE INVENTION

1. Field of the Invention

This invention relates to tube couplings and in particular to a tube coupling having an insert portion receivable in the tube end and means for selectively clamping the tube end to the insert.

2. Description of the Prior Art

In U.S. Letters Pat. No. 3,219,367 of George E. Franck, issued Nov. 23, 1965 for a Tube Connector with Permanently Assembled Sleeve and Nut Elements, owned by the assignee hereof, a tube connector is shown to include a sleeve which is maintained captive relative to the nut by means of an outturned flange on the sleeve engaging an inturned flange on the nut. In the Williams, et al, U.S. Letters Pat. No. 2,552,077 for a Coupling for Flexible Pipes, a coupling is shown having a split sleeve including an outturned distal flange. In the Williams, et al, patent, the body member includes an insert portion received in the distal end of the hose.

Further examples of tube couplings wherein a sleeve is provided with an outturned distal flange are shown in the J. C. Richardson U.S. Letters Pat. Nos. 2,497,273, 2,544,108, and 2,547,889.

Still further disclosures of such sleeves are illustrated in Zimmer U.S. Pat. No. 2,333,612, Snyder U.S. Pat. No. 2,406,478, and Somers U.S. Pat. No. 3,191,971.

SUMMARY OF THE INVENTION

The present invention comprehends an improved tube coupling having a sleeve which is constricted as an incident of threaded rotation of a nut onto a body portion of the coupling to be urged into the outer wall surface of the tube end to be coupled. As a result of the constriction of the sleeve nose, a frictional retaining force is developed between the tube and an insert portion of the body received coaxially within the tube.

The sleeve further includes an outturned distal flange in the form of a flare which has a strength preselected to prevent deformation thereof sufficient to permit the nut member to pass thereover while permitting the nut to provide a force on the sleeve sufficient to cause the tube end to be withdrawn from the insert by overcoming the frictional retaining force between the tube end and insert maintained by the constricted nose. Thus, the nose is effectively fixedly positioned on the tube end while yet the nut may be utilized as means for effecting initial withdrawal movement of the tube when it is desired to disconnect the tube end from the coupling.

Thus, the tube coupling of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a tube coupling embodying the invention;

FIG. 2 is a fragmentary diametric section illustrating the method of providing the outturned flange on the sleeve;

FIG. 3 is a diametric section illustrating a first step in the make-up of the coupling;

FIG. 4 is a diametric section illustrating the made-up coupling; and

FIG. 5 is a diametric section illustrating the withdrawal of the tube end by the threaded withdrawal of the nut relative to the body.

DESCRIPTION OF THE PREFERRED EMBODIMENT

In the exemplary embodiment of the invention as shown in the drawing, a tube coupling generally designated 10 is shown to comprise a body 11, a nut 12, and a sleeve 13. Sleeve 13 is maintained captive relative to the nut 12 by means of an outturned flange 14 which may be formed as shown in FIG. 2 by a frustoconical tool 15 with the sleeve disposed coaxially within the nut 12.

More specifically, the sleeve defines an annular element having a radially enlarged mid-portion 16 defining at its axially outer end a frustoconical reaction surface 17 selectively engaged by a corresponding frustoconical pressure surface 18 of the nut 12. The sleeve further includes a frustoconical nose 19 and a through bore 20. As shown in FIG. 2, the sleeve may be retained by a backup element 21 while flaring tool 15 is urged coaxially into bore 20 to form a flare in the unsupported distal end of the sleeve defining flange 14. Sufficient clearance is provided between an inturned nut flange 22, the reaction surface 17 and the flare 14 to permit free rotation of the nut on the sleeve in the captive association thereof.

As best seen in FIG. 3, body 11 defines a through bore 23 opening axially outwardly through a tubular insert 24 adapted to be received within the tube end 25. Body 11 further defines an annular axially outwardly opening recess 26 surrounding the inner end of the insert 24 and adapted to receive the distal portion 27 of the tube end 25.

Body 11 further defines a camming surface 28 adapted to be engaged by a frustoconical surface 29 of sleeve nose 19 during the make-up of the coupling, thereby to constrict nose 19 radially into the outer surface of tube end 25, as illustrated in FIG. 4. To effect such constriction of nose 19, nut 12 is provided with a female threaded portion 30 threaded to a male threaded portion 31 of body 11 whereby threaded advance of the nut on the body thread 31 causes pressure surface 18 of the nut to move axially inwardly against reaction surface 17 of the sleeve to force the sleeve nose surface 29 against the camming surface 28. Because of the free rotational relationship between the nut and sleeve, torque transmission between the nut and sleeve is effectively minimized thereby effectively preventing undesirable twisting of tube end 25 during the make-up of the coupling.

The constriction of sleeve nose 19 further develops a frictional retaining force between the tube end 25 and the insert 24. Insert 24 comprises a rigid tubular element and, thus, the tube end 25 is effectively clamped between the sleeve nose and the insert in the made-up arrangement of the coupling. As seen in FIG. 4, the constriction of the sleeve nose 19 into the tube end wall and the clamping of the tube end resulting therefrom effectively prevent axial withdrawal of the tube end from the coupling outwardly through the sleeve.

The frictional retaining force between the tube end and insert is preferably relatively large. Thus, to disassemble the coupling, it is desirable to provide means for providing a suitable relatively large withdrawal force to overcome this retention. The present invention comprehends forming the flare 14 to have a strength preselected to preclude constriction thereof to a diameter smaller than the inner diameter of the nut flange 22 by a force applied to flare 14 by the nut flange sufficient to overcome the frictional retaining force between tube end 25 and insert 24 maintained by the constricted nose 19. Thus, as shown in FIG. 5, threaded withdrawal of nut 12 from body 11 causes axial movement of sleeve 13 outwardly from body 11 so as to withdraw tube end 25 against the retaining force with the sleeve 13 fixedly positioned on the tube end.

Flare, or flange, 14 provides a rounded surface 32 for supporting the projecting portion 33 of the tube end 25 against angular displacement thereof relative to the axis of the coupling, thereby effectively precluding cracking of the tube end adjacent the sleeve end 13. Further, the flare cooperates with the nut flange to effect a self-centering of the sleeve coaxially relative to the nut for improved facilitated assembly and make-up of the coupling.

In the illustrated embodiment, sleeve 13 is formed of metal to provide the high strength characteristics discussed above. As shown in FIG. 5, the insert may have a length sufficient to have the sleeve nose 19 disposed radially outwardly adjacent the outer end of the insert when the nut is freed of threaded engagement with body thread 31.

The inner edge 34 of nose 19 is preferably right angular so as to bite into the tube wall, as illustrated in FIG. 4, and effectively preclude longitudinal outward movement of the tube end 25 relative to the sleeve 13 once the coupling has been made-up. The inward constriction of the nose 19 further is sufficient to preclude axially outward displacement of the sleeve relative to the tube when the nut is unthreaded from the body as discussed above.

The radially inner axially outer edge 35 of nut flange 22 is preferably rounded to facilitate the forming of the outturned flange 14 to define a smooth flare for effectively minimizing cracking of the tube end 25 as by angular deflection of the projecting portion thereof relative to the fitting.

The foregoing disclosure of specific embodiments is illustrative of the broad inventive concepts comprehended by the invention.

I claim:

1. In a tube coupling having a body defining a tubular insert adapted to be received in the end of a tube to be coupled for radially supporting the tube end in a made-up arrangement, said body further defining an annular camming surface circumjacent said insert, and a nut having an axially inner portion threaded to said body and an axially outer inturned flange defining an axially inwardly facing pressure surface, a sleeve comprising an annular member having a through bore for closely receiving said tube end in said made-up arrangement, an axially inner nose engaging said body camming surface, a reaction surface engaged by said nut pressure surface for urging the sleeve axially inwardly as a result of threaded advance of the nut on the body thereby to cause permanent inward radial constriction of said nose by said camming surface against the outer wall surface of said tube wall during make-up of the fitting thereby permanently locking said annular sleeve member to said tube end against relative axial movement therebetween, and thereby effectively preventing axial withdrawal of said tube end outwardly through said sleeve and forcing said tube end against said insert to provide a frictional retaining force between the tube end and said insert in said made-up arrangement, the axially outer end of said sleeve being flared to define means on said sleeve axially engageable by said nut flange for effectively precluding movement of said nut flange axially outwardly past said flared end, said flared end of the sleeve having a strength preselected to preclude constriction thereof to a diameter smaller than the inner diameter of said nut flange by a force applied thereto by said nut flange sufficient to overcome the frictional retaining force between the tube end and insert maintained by the constricted nose thereby to cause axial withdrawal away from said body of the tube end and the sleeve fixed thereon by a threaded withdrawal of the nut from the body.

2. The tube coupling structure of claim 1 wherein the radially inner surface of said sleeve flared end is rounded in axial cross section.

3. The tube coupling structure of claim 1 wherein said sleeve is spaced radially inwardly from said nut flange to permit free rotation of the sleeve within the nut for effectively precluding twisting of the tube during make-up of the fitting whenever the nut is threadedly advanced on the body.

4. The tube coupling structure of claim 1 wherein the length of said insert is preselected to have the sleeve nose disposed radially outwardly adjacent the outer end of the insert when the nut is freed of the threaded engagement with the body.

5. The tube coupling structure of claim 1 wherein shoulder means are provided on the sleeve for cooperating with said nut flange to maintain the sleeve against axial outward displacement relative to the nut.

6. The tube coupling structure of claim 1 wherein said body defines an axially outwardly opening annular recess with said tubular insert extending axially outwardly from the axially inner end of said recess whereby the distal inner portion of said tube end is received in said recess about the axially inner end of the insert.

7. The tube coupling structure of claim 1 wherein said sleeve nose defines a radially inner sharp edge which bites into said outer wall surface of the tube wall to provide an effectively positive mechanical interlock against axial outward movement of the tube relative to the sleeve.

8. In a tube coupling having a body defining a tubular insert adapted to be received in the end of a tube to be coupled for radially supporting the tube end in a made-up arrangement, said body further defining an annular camming surface circumjacent said insert, and a nut having an axially inner portion threaded to said body and an axially outer inturned flange defining an axially inwardly facing pressure surface, structure comprising: an annular sleeve member having a through bore for closely receiving said tube end in said made-up arrangement, an axially inner nose engaging said body camming surface, a reaction surface engaged by said nut pressure surface for urging the sleeve axially inwardly as a result of threaded advance of the nut on the body thereby to cause permanent inward radial constriction of said nose by said camming surface against the outer wall surface of said tube wall during make-up of the fitting thereby permanently locking said annular sleeve member to said tube end against relative axial movement therebetween, and thereby effectively preventing axial withdrawal of said tube end outwardly through said sleeve and forcing said tube end against said insert to provide a frictional retaining force between the tube end and said insert in said made-up arrangement; and cooperating yieldable means on said nut and sleeve member for causing longitudinal outward movement of the sleeve member and tube end with the nut while overcoming said frictional retaining force between the tube end and insert.

* * * * *